United States Patent
Xiao et al.

(10) Patent No.: US 12,101,686 B2
(45) Date of Patent: Sep. 24, 2024

(54) POSITION INFORMATION DETERMINATION METHOD AND DEVICE, AND FIRST TERMINAL AND SECOND TERMINAL

(71) Applicant: ZTE CORPORATION, Shenzhen (CN)

(72) Inventors: Huahua Xiao, Shenzhen (CN); Chuangxin Jiang, Shenzhen (CN); Zhaohua Lu, Shenzhen (CN); Cheng Bi, Shenzhen (CN); Youxiong Lu, Shenzhen (CN); Boyuan Zhang, Shenzhen (CN); Wei Luo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 316 days.

(21) Appl. No.: 17/634,928

(22) PCT Filed: Aug. 13, 2020

(86) PCT No.: PCT/CN2020/108804
§ 371 (c)(1),
(2) Date: Feb. 11, 2022

(87) PCT Pub. No.: WO2021/027861
PCT Pub. Date: Feb. 18, 2021

(65) Prior Publication Data
US 2022/0279310 A1    Sep. 1, 2022

(30) Foreign Application Priority Data
Aug. 13, 2019    (CN) .......................... 201910745698.2

(51) Int. Cl.
*H04W 4/02* (2018.01)

(52) U.S. Cl.
CPC ........... *H04W 4/023* (2013.01); *H04W 4/025* (2013.01)

(58) Field of Classification Search
CPC ....... H04W 64/00; H04W 92/18; H04W 4/40; H04W 64/003; H04W 88/02;
(Continued)

(56) References Cited

U.S. PATENT DOCUMENTS

2016/0337805 A1    11/2016  Liao et al.
2017/0146660 A1    5/2017   Xu et al.
(Continued)

FOREIGN PATENT DOCUMENTS

CN    106662634 A    5/2017
CN    106707319 A    5/2017
(Continued)

OTHER PUBLICATIONS

Supplemental European Search Report for Application No. 20851553.6, dated Aug. 3, 2023, 11 pages.
(Continued)

*Primary Examiner* — Kwasi Karikari
(74) *Attorney, Agent, or Firm* — Morgan, Lewis & Bockius LLP

(57) ABSTRACT

Provided are a location information determination method and device, a first terminal, and a second terminal. The location information determination method includes transmitting positioning request information; receiving positioning assistance data transmitted by a second terminal; calculating a positioning assistance parameter according to the positioning assistance data; and transmitting the positioning assistance parameter or calculating location information of a first terminal according to the positioning assistance parameter.

18 Claims, 3 Drawing Sheets

(58) Field of Classification Search
CPC ..... H04W 4/029; H04W 4/023; H04W 4/025; H04W 4/46; H04W 76/15; H04W 4/027; H04W 84/005
See application file for complete search history.

(56) References Cited

U.S. PATENT DOCUMENTS

| | | | | |
|---|---|---|---|---|
| 2017/0150314 | A1* | 5/2017 | Hwang | ................ H04W 64/00 |
| 2018/0077529 | A1 | 3/2018 | Ryu et al. | |
| 2019/0174286 | A1* | 6/2019 | Guo | ................... H04W 72/02 |

FOREIGN PATENT DOCUMENTS

| | | | |
|---|---|---|---|
| CN | 109327901 | A | 2/2019 |
| CN | 109479255 | A | 3/2019 |
| CN | 109842934 | A | 6/2019 |
| CN | 110036307 | A | 7/2019 |
| CN | 110062457 | A | 7/2019 |
| CN | 110536234 | A | 12/2019 |
| EP | 3051891 | A1 | 8/2016 |
| WO | WO2019027245 | A1 | 2/2019 |

OTHER PUBLICATIONS

Chinese First Search Report for Application No. 2019107456982, dated Oct. 26, 2022, 6 pages including English translation.
Chinese First Office Action for Application No. 201910745698.2, dated Nov. 4, 2022, 12 pages including English translation.
Wang et al., "Design and Implementation of cooperative Intelligent Transport Systems (C-ITS) based on Dedicated Short Range Communications (DSRC)", Laser Journal (vol. 38, No. 6, 2017), ?1994-2017 China Academic Journal Electronic Publishing House, http://www.laserjournal.cn, 4 pages including translation.
Intel Corporation et al., "New SID: Study on NR positioning support", #GPP TSG RAN Meeting #75, RP-170702, Dubrovnik, Croatia, Mar. 6-9, 20'7, 19 pages.
International Search Report for Application No. PCT/CN2020/108804, dated Nov. 17, 2020, 6 pages including English translation.

* cited by examiner

POSITION INFORMATION DETERMINATION METHOD AND DEVICE, AND FIRST TERMINAL AND SECOND TERMINAL

CROSS-REFERENCE TO RELATED APPLICATIONS

This is a National Stage Application filed under 35 U.S.C. 371 based on International Patent Application No. PCT/CN2020/108804, filed on Aug. 13, 2020, which claims priority to Chinese Patent Application No. 201910745698.2 filed with the China National Intellectual Property Administration (CNIPA) on Aug. 13, 2019, the contents of which are incorporated herein by reference in their entireties.

TECHNICAL FIELD

The present application relates to the field of communications, for example, a position information determination method and device, a first terminal, and a second terminal.

BACKGROUND

Positioning is an important technology in wireless communications, and the positioning function is supported by standards such as Long-Term Evolution (LTE), LTE-Advanced (LTE-A), and New Radio (NR) Access Technology.

In addition, vehicle-to-everything (V2X), a wireless communication technology for vehicles, is a new generation of information and communication technology that connects vehicles with everything. X here mainly includes, but is not limited to, vehicles, pedestrians, roadside infrastructures, networks, and various base stations. Through V2X, the interaction between vehicles and various devices can be strengthened, thereby comprehensively improving a perception range of an active safety system of a vehicle, avoiding safety accidents, building an information interaction bridge, and serving future autonomous driving. To satisfy the requirements for safety, it is rather important to obtain location information between the vehicles. The location information here includes absolute geographic location information and relative geographic location information. Obtaining the position of a vehicle of V2X through a wireless communication system is an effective means of obtaining the position.

In the wireless communication technology, when a terminal (including but not limited to a vehicle-mounted wireless communication system terminal, a vehicle, a pedestrian, a portable device, and a mobile phone) needs to obtain location information of another terminal, especially when the terminal is not in coverage areas of various network side devices (including but not limited to a macro base station, a micro base station, radio remote, a positioning server, a positioning base station, a positioning manager, various roadside devices, and a network side part of the roadside infrastructures), no good solution is provided.

SUMMARY

The present application provides a location information determination method and device, a first terminal, and a second terminal, which achieve the positioning of a first terminal outside coverage areas of various network side devices.

An embodiment of the present application provides a location information determination method. The method is applied to a first terminal and includes that: positioning request information is transmitted; positioning assistance data transmitted by a second terminal is received; a positioning assistance parameter is calculated according to the positioning assistance data; and the positioning assistance parameter is transmitted, or location information of the first terminal is calculated according to the positioning assistance parameter.

An embodiment of the present application further provides a location information determination method. The method is applied to a second terminal and includes that: positioning request information transmitted by a first terminal is received; positioning assistance data is transmitted.

An embodiment of the present application further provides a location information determination device. The device includes a request transmitting module, a receiving module, a first calculation module, and a parameter transmitting module or a second calculation module.

The request transmitting module is configured to transmit positioning request information. The receiving module is configured to receive positioning assistance data transmitted by a second terminal. The first calculation module is configured to calculate a positioning assistance parameter according to the positioning assistance data. The parameter transmitting module is configured to transmit the positioning assistance parameter, or the second calculation module is configured to calculate location information of a first terminal according to the positioning assistance parameter.

An embodiment of the present application further provides a location information determination device. The device includes a receiving module and a transmitting module.

The receiving module is configured to receive positioning request information transmit by a first terminal. The transmitting module is configured to transmit positioning assistance data.

An embodiment of the present application further provides a first terminal. The first terminal includes one or more processors and a storage device storing one or more programs.

The one or more programs, when executed by the one or more processors, cause the one or more processors to implement the location information determination method applied to the first terminal.

An embodiment of the present application further provides a second terminal. The second terminal includes one or more processors and a storage device storing one or more programs.

The one or more programs, when executed by the one or more processors, cause the one or more processors to implement the location information determination method applied to the second terminal.

An embodiment of the present application further provides a storage medium storing a computer program, where the computer program, when executed by a processor, implements any one of the methods in embodiments of the present application.

DETAILED DESCRIPTION

Embodiments of the present application are described below in conjunction with drawings.

The steps illustrated in the flowcharts among the drawings may be performed by, for example, a computer system including a set of computer-executable instructions. Moreover, although logical sequences are illustrated in the flowcharts, in some cases, the illustrated or described steps may be performed in sequences different from the sequences described herein.

Figure 1:
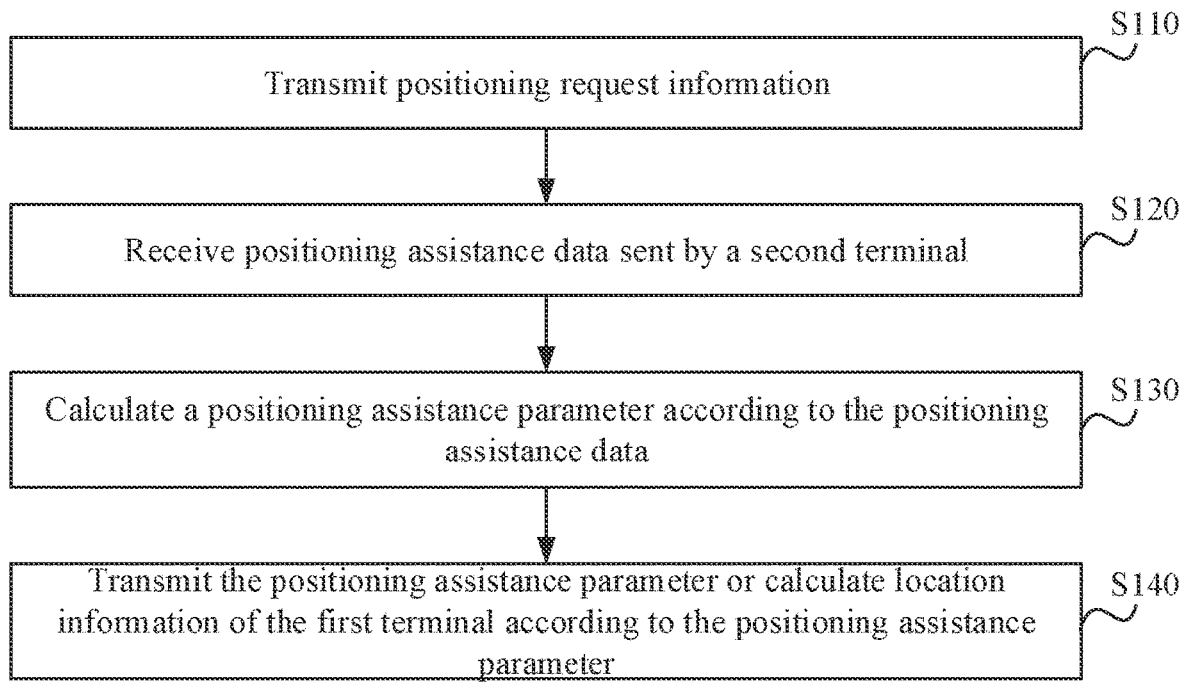
FIG. 1 is a flowchart of a location information determination method according to an embodiment of the present application.

In an exemplary implementation, FIG. 1 is a flowchart of a location information determination method according to an embodiment of the present application. This method may apply to a case where a first terminal is positioned when the first terminal is not in coverage areas of various network side devices. This method may be executed by a location information determination device, which may be implemented by software and/or hardware and integrated on the first terminal.

Terminals include, but are not limited to, vehicles capable of receiving signals, mobile devices, portable devices (such as computers), and mobile phones. Here, the terminals are divided into two terminals, that is, a first terminal and a second terminal. The first terminal is a terminal that needs to be positioned, such as a terminal outside the coverage areas of various network side devices, and the second terminal is within the coverage of various network side devices and participates in a process of positioning the first terminal. At least two second terminals may participate in the process of positioning the first terminal. At least two second terminals participating in the positioning of the first terminal form a terminal list, and identifiers of at least two second terminals may be stored in the terminal list. The network side devices include, but are not limited to, a macro base station, a micro base station, radio remote, a positioning server, a positioning base station, a positioning manager, various roadside devices, and a network side part of roadside infrastructures.

A wireless communication technology, vehicle-to-vehicle (V2X), for vehicles may be divided into four scenarios: V2V, vehicle-to-infrastructure (V2I), vehicle-to-pedestrian (V2P), and vehicle-to-network (V2N) with real-time and efficient two-way communication A positioning reference signal (PRS) is a reference signal used for positioning. Generally, a base station or a positioning server, or a terminal participating in positioning may configure and transmit a PRS to a terminal that needs to be positioned. A PRS configuration includes at least one of the following: a PRS period, a PRS pattern, a PRS transmitting slot, a PRS slot offset, a PRS sequence, the number $N_{PRS}$ of consecutive PRS slots, or PRS muting periodicity and offset. The PRS pattern is a set of resource elements (REs) occupied by the PRS in one slot. For a periodic PRS, the periodicity and slot offset of the PRS may be determined through a joint parameter PRS configuration index $I_{PRS}$, and the PRS muting periodicity and offset are used for calculating slots where no PRS needs to be transmitted. The slot is a combination of symbols, including at least two symbols. The symbols include, but are not limited to, orthogonal frequency-division multiplexing (OFDM) symbols, orthogonal frequency-division multiple access (OFDMA) symbols, and single-carrier orthogonal frequency-division multiple access (SC-OFDMA) symbols. Table 1 shows a relationship between the PRS configuration index and the periodicity and offset. Table 1 shown below is about the periodicity and offset.

TABLE 1

Relationship between the PRS Configuration Index and the Periodicity and Offset

| PRS configuration index $I_{PRS}$ | PRS periodicity $T_{PRS}$ | PRS subframe offset $K_{PRS}$ |
|---|---|---|
| 0-159 | 160 | $I_{PRS}$ |
| 160-479 | 320 | $I_{PRS}$ - 160 |
| 480-1119 | 640 | $I_{PRS}$ - 480 |
| 1120-2399 | 1280 | $I_{PRS}$ - 1120 |
| 2400-4095 | Reserved | Reserved |

A sidelink is a link used for terminal-to-terminal communication.

Sidelink control information (SCI) is used for scheduling control signaling of a physical sidelink control channel (PSCCH), including format 0 and format 1. Format 0 includes at least the following domains: a frequency hopping flag, resource block assignment and hopping resource allocation, a time domain allocation pattern, a modulation and coding scheme, and a timing advance indication. Format 1 includes at least the following domains: a priority, resource reservation, a frequency resource location of initial transmission and retransmission, a time gap between initial transmission and retransmission, a modulation and coding scheme, a retransmission index, and reserved bit information.

A synchronization signal block (SSB) includes at least one of the following: an SSB resource, a physical broadcast channel (PBCH) resource, or an SSB/PBCH resource.

A positioning assistance parameter includes, but is not limited to, at least one of the following: observed time difference of arrival (OTDOA), time of arrival (TOA), reference signal time difference (RSTD), reference signal received power (RSRP), receive-transmit (RX-TX) time difference, relative time of arrival (RTOA), an angle of arrival (AoA), an angle of departure (AOD), a zenith angle of departure (ZOD), or a zenith angle of arrival (ZOA).

Location information includes, but is not limited to, absolute geographic coordinates and relative geographic coordinates. The relative geographic coordinates are geographic coordinates relative to reference geographic coordinates. For example, if the reference geographic coordinates are coordinates of terminal 0, the relative geographic coordinates are coordinates relative to the terminal 0. Relative geographic coordinates can let different terminals know relative distances and orientations between different terminals. Geographic coordinates here may be Cartesian coordinates such as (x, y, z) and (x, y) or polar coordinates such as (r, theta, beta), where x, y, and z are real numbers, denoting x-axis, y-axis, and z-axis of coordinates, respectively; z denotes a height; r, theta, and beta denote a radius, a horizontal azimuth angle, and a vertical pitch angle, respectively, where the radius is a positive real number, and theta and beta may be any real number.

"Transmitting" in the present application includes at least one of the following manner of transmitting data or signals: unicast, broadcast, transmission through a physical downlink control channel, transmission through a physical downlink shared channel, transmission through a physical uplink control channel, transmission through a physical uplink shared channel, transmission through high-level signaling, or transmission through a sidelink.

As shown in FIG. 1, a location information determination method provided in the present application includes S110, S120, S130, and S140.

In S110, positioning request information is transmitted.

The positioning request information is used for requesting a second terminal to transmit positioning assistance data.

In the case where a first terminal has a positioning demand, the first terminal may transmit the positioning request information to request the second terminal to transmit the positioning assistance data so that the first terminal performs positioning based on the positioning assistance data. Alternatively, in the case where the first terminal has a positioning demand, the first terminal may transmit the positioning request information to notify the second terminal that the first terminal has the positioning demand; after receiving the positioning request information, the second terminal transmits the positioning assistance data.

The first terminal may receive positioning assistance data from at least two second terminals to perform positioning based on the received positioning assistance data.

In S120, positioning assistance data transmitted by a second terminal is received.

After transmitting the positioning request information, the first terminal may receive the positioning assistance data transmitted by the second terminal, where the positioning assistance data may assist the first terminal in determining location information.

In S130, a positioning assistance parameter is calculated according to the positioning assistance data.

The first terminal may first calculate the positioning assistance parameter based on the positioning assistance data.

The positioning assistance data may include at least one of the following: positioning reference signal configuration information, terminal location information of the second terminal, a terminal list, a terminal movement speed of the second terminal, a terminal movement direction of the second terminal, or timing advance information. The positioning assistance parameter may include at least one of the following: observed time difference of arrival, time of arrival, reference signal time difference, reference signal received power, receive-transmit time difference, relative time of arrival, an angle of arrival, an angle of departure, a zenith angle of departure, or a zenith angle of arrival. The terminal list may be a set of all second terminals participating in the positioning of the first terminal. Only one second terminal among multiple second terminals may transmit the terminal list. The first terminal receives the positioning assistance data of at least two second terminals identified in the terminal list so that the first terminal performs positioning based on the received positioning assistance data.

In S140, the positioning assistance parameter is transmitted or location information of the first terminal is calculated according to the positioning assistance parameter.

Different manners for calculating the location information according to different positioning measurement capabilities of the first terminal are provided. A positioning measurement capability of the first terminal may include at least one of the following that: the first terminal has a location information estimation capability or the first terminal has only a positioning assistance parameter estimation capability.

In the case where the first terminal has the location information estimation capability, the first terminal may directly calculate the location information of the first terminal according to the positioning assistance parameter. In the case where the first terminal has only the capability of estimating the positioning assistance parameter, the first terminal transmits the positioning assistance parameter so that the second terminal completes the calculation of the location information of the first terminal; then the first terminal receives the location information of the first terminal transmitted by the second terminal, where the second terminal may be a terminal having the location information estimation capability.

The location information determination method provided in the present application includes transmitting positioning request information; receiving positioning assistance data transmitted by a second terminal; calculating a positioning assistance parameter according to the positioning assistance data; and transmitting the positioning assistance parameter, or calculating location information of a first terminal according to the positioning assistance parameter. In this manner, the positioning of the first terminal is achieved, that is, the location information of the first terminal outside coverage areas of network side devices is determined.

Based on the preceding embodiment, a variant embodiment of the preceding embodiment is provided. For the brevity of description, only differences from the preceding embodiment are described in the variant embodiment.

In an embodiment, at least two second terminals are provided.

In the case where the first terminal receives the positioning assistance data transmitted by the second terminals, at least two second terminals are provided. That is, each of at least two second terminals transmits a respective positioning assistance parameter. The second terminals are in the terminal list in which terminals participate in the positioning of the first terminal.

In an embodiment, the positioning assistance data includes at least one of the following information of the second terminal: positioning reference signal configuration information, terminal location information, a terminal list, a terminal movement speed, a terminal movement direction, or timing advance information. The timing advance information is mainly used for uplink synchronization and refers to a negative offset between the start time of receiving a downlink subframe and the time of transmitting an uplink subframe. The base station may control the time for uplink signals from different user equipments (UEs) to reach the base station by appropriately controlling an offset of each UE. For example, the second terminal controls an offset of the first terminal.

The terminal location information includes, but is not limited to, relative geographic coordinates and absolute geographic coordinates of the terminal. The terminal list may identify the second terminal participating in the positioning of the first terminal and indicate that at least two terminals in the terminal list need to participate in the positioning through identifiers in the actual positioning. An identifier can uniquely identify a corresponding terminal. The positioning reference signal configuration information may be information indicating a positioning reference signal configuration. The PRS configuration includes at least one of the following: a PRS period, a PRS pattern, a PRS transmitting slot, a PRS slot offset, a PRS pilot sequence, the number $N_{PRS}$ of consecutive PRS slots, or PRS muting periodicity and offset.

In an embodiment, in the case where the positioning assistance data includes the positioning reference signal configuration information, the positioning reference signal configuration information includes at least one of the following: a positioning reference signal pattern, a positioning reference signal transmitting slot, PRS transmitting periodicity and offset, positioning reference signal muting, or a positioning reference signal sequence, that is, a positioning reference signal pilot sequence.

In an embodiment, the method further includes the following: positioning parameter information is transmitted, where the positioning parameter information includes at least one of the following of the first terminal: a positioning measurement capability, a terminal movement speed, or a movement direction.

The positioning measurement capability may indicate at least one of the following that: the first terminal has a location information estimation capability or the first terminal has only a positioning assistance parameter estimation capability.

In an embodiment, the positioning request information includes the positioning parameter information.

In an embodiment, the positioning parameter information is transmitted independently of the positioning request information. The transmitting time is not limited, that is, the positioning parameter information is transmitted through positioning parameter information transmitting signaling besides the positioning request information. The signaling may be transmitted at the same time as the positioning request information or may be transmitted after or before the positioning request information is transmitted.

In an embodiment, the positioning assistance data is transmitted through sidelink control information.

In an embodiment, the sidelink control information includes a domain of the positioning assistance data which is configured to indicate content of the positioning assistance data.

In an embodiment, the sidelink control information includes a positioning enable identifier, where the positioning enable identifier is configured to indicate signaling content of the sidelink control information.

The positioning enable identifier may be a positioning assistance data enable identifier which is configured to indicate whether the sidelink control information is signaling for transmitting sidelink scheduling information or signaling for transmitting the positioning assistance data. For different signaling contents, the positioning enable identifier may be set to different values, which is not limited herein.

In an embodiment, indicating, by the positioning enable identifier, the signaling content of the SCI includes: in the case where a value of the positioning enable identifier is first data, indicating that the sidelink control information is used for transmitting sidelink scheduling information; and in the case where the value of the positioning enable identifier is second data, indicating that the sidelink control information is used for transmitting the positioning assistance data.

In an example, the first data is 0 and the second data is 1; or the first data is 1 and the second data is 0.

In an embodiment, the positioning assistance data is transmitted through sidelink synchronization information block.

In an embodiment, the sidelink synchronization information block includes a domain related to the positioning assistance data configured to indicate content of the positioning assistance data.

In an embodiment, a resource for transmitting the positioning assistance data by the second terminal is configured by a leader terminal, where the resource for transmitting the positioning assistance data includes at least one of the following: a time domain resource, a frequency domain resource, a code domain resource, or a space domain resource.

The leader terminal determines the resource for transmitting the positioning assistance data, where the resource for transmitting the positioning assistance data includes at least one of the following: a time domain resource, a frequency domain resource, a code domain resource, or a space domain resource; and the space domain resource includes, but is not limited to, one of the following: a transmitting beam, a receiving beam, a transmitting port group, a receiving port group, a transmitting panel, or a receiving panel. The leader terminal may be any one of terminals included in the terminal list. The leader terminal is configured by the base station, or configured by the first terminal, or determined through the mutual negotiation between the terminals included in the terminal list. The leader terminal may also be a terminal other than the terminals included in the terminal list and has greater authority that can control the second terminals included in the terminal list.

In an embodiment, calculating the location information of the first terminal according to the positioning assistance parameter includes calculating the location information of the first terminal according to terminal location information of the second terminal and the positioning assistance parameter.

In the case where the positioning assistance data includes the terminal location information of the second terminal, the terminal location information of the second terminal in the positioning assistance data may be directly extracted. In the case where the terminal location information of the second terminal does not exist in the positioning assistance data, the terminal location information of the second terminal transmitted by the second terminal may be received.

In an embodiment, the positioning assistance parameter includes at least one of the following: observed time difference of arrival, time of arrival, reference signal time difference, reference signal received power, receive-transmit time difference, relative time of arrival, an angle of arrival, an angle of departure, a zenith angle of departure, or a zenith angle of arrival.

In an embodiment, the method further includes that: the location information of the first terminal is broadcast.

After calculating the location information of the first terminal according to the positioning assistance parameter, the first terminal broadcasts the location information. The second terminal receives the location information broadcast by the first terminal.

In an embodiment, in the case where the first terminal transmits the positioning assistance parameter, the method further includes that: the location information of the first terminal is received. That is, in the case where the first terminal has only the capability of estimating the positioning assistance parameter, the method further includes that the location information of the first terminal is received to achieve the positioning of the first terminal.

After the first terminal transmits the positioning assistance parameter, the second terminal (the second terminal has the location information estimation capability) configured to calculate the position of the first terminal needs to receive location information of at least one terminal other than the second terminal itself included in the terminal list. When the second terminal calculates the location information of the first terminal, the second terminal needs to receive the location information of at least one terminal other than the second terminal itself in the terminal list, so as to calculate the location information of the first terminal based on the location information of at least one terminal other than the second terminal itself in the terminal list, the terminal location information of the second terminal, and the positioning assistance parameter.

Figure 2:
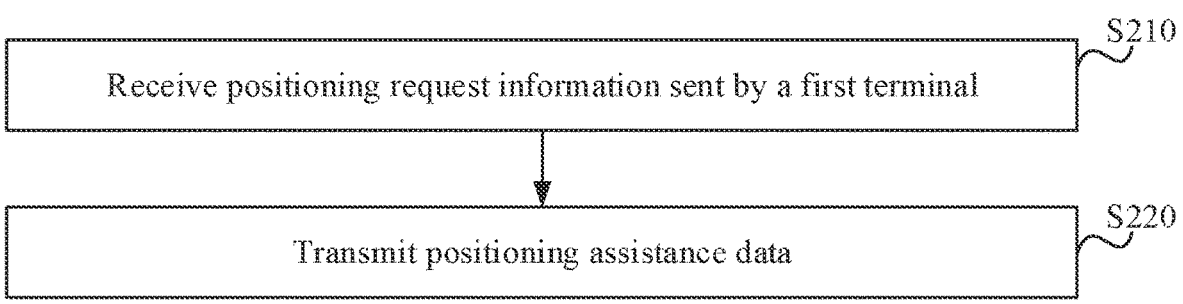
FIG. 2 is a flowchart of another location information determination method according to an embodiment of the present application.

In an exemplary implementation, the present application further provides a location information determination method. FIG. 2 is a flowchart of another location information determination method according to an embodiment of the present application. This method may apply to the positioning of a first terminal, that is, to the determination of location information of the first terminal. This method may be executed by a location information determination device provided in the present application, and the location information determination device may be implemented by software and/or hardware and integrated on a second terminal. For the content that is not yet exhaustive in this embodiment, reference may be made to the preceding embodiment, which is not repeated herein.

As shown in FIG. 2, a location information determination method provided in the present application includes S210 and S220.

In S210, positioning request information transmitted by a first terminal is received.

The positioning request information is used for requesting a second terminal to transmit positioning assistance data.

In S220, positioning assistance data is transmitted.

The location information determination method provided in the present application includes receiving positioning request information transmitted by a first terminal and transmitting positioning assistance data so that the positioning of the first terminal can be effectively achieved.

Based on the preceding embodiment, a variant embodiment of the preceding embodiment is provided. For the brevity of description, only differences from the preceding embodiment are described in the variant embodiment.

Multiple second terminals may participate in the positioning of the first terminal. In this embodiment, that one second terminal interacts with the first terminal is used as an example for description.

In an embodiment, the positioning assistance data includes at least one of the following information of the second terminal: positioning reference signal configuration information, terminal location information, a terminal list, a terminal movement speed, a terminal movement direction, or timing advance information.

In an embodiment, in the case where the positioning assistance data includes the positioning reference signal configuration information, the positioning reference signal configuration information includes at least one of the following: a positioning reference signal pattern, a positioning reference signal transmitting slot, positioning reference signal transmitting periodicity and offset, positioning reference signal muting, or a positioning reference signal sequence.

In an embodiment, the method further includes that: positioning parameter information is received, where the positioning parameter information includes at least one of the following of the first terminal: a positioning measurement capability, a movement speed, or a movement direction.

In an embodiment, the second terminal receives the positioning parameter information, where the positioning parameter information is the positioning measurement capability of the first terminal, and whether the positioning assistance parameter calculated by the first terminal and the location information of a terminal other than the second terminal itself need to be received is determined according to the positioning measurement capability of the first terminal. In the case where the positioning parameter information includes the terminal movement speed of the first terminal and the terminal movement direction of the first terminal, movement displacement information of the first terminal may be calculated according to the terminal movement speed of the first terminal and the terminal movement direction of the first terminal, so as to dynamically adjust or correct the location information of the first terminal.

In an embodiment, the positioning request information includes the positioning parameter information.

In an embodiment, the positioning parameter information is transmitted independently of the positioning request information. The transmitting time is not limited, that is, the positioning parameter information is transmitted through positioning parameter information transmission signaling besides the positioning request information. The signaling may be transmitted at the same time as the positioning request information or may be transmitted after or before the positioning request information is transmitted.

In an embodiment, transmitting the positioning assistance data includes transmitting the positioning assistance data through sidelink synchronization information block.

In an embodiment, the sidelink synchronization information block includes a domain of the positioning assistance data configured to indicate content of the positioning assistance data.

In an embodiment, transmitting the positioning assistance data includes transmitting the positioning assistance data through sidelink control information.

In an embodiment, the sidelink control information includes a domain of the positioning assistance data which is configured to indicate content of the positioning assistance data.

In an embodiment, the sidelink control information includes a positioning enable identifier, where the positioning enable identifier is configured to indicate signaling content of the SCI.

In an embodiment, the method further includes that: in the case where the sidelink control information is for transmitting sidelink scheduling information, a value of the positioning enable identifier is set to be first data; and in the case where the sidelink control information is for transmitting the positioning assistance data, the value of the positioning enable identifier is set to be second data.

In an embodiment, a resource for transmitting the positioning assistance data by the second terminal is configured by a leader terminal, where the resource for transmitting the positioning assistance data includes at least one of the following: a time domain resource, a frequency domain resource, a code domain resource, or a space domain resource.

In an embodiment, the method further includes that: the positioning assistance parameter is received; and the location information of the first terminal is calculated according to the positioning assistance parameter and location information of at least two terminals included in the terminal list.

In the case where the second terminal calculates the location information of the first terminal, the method further includes that: terminal location information of remaining terminals in the terminal list is received. The location information of the first terminal is calculated according to the positioning assistance parameter and the terminal location information of the terminals included in the terminal list, that is, the terminal location information of the remaining terminals and the terminal location information of the second terminal.

In an embodiment, the method further includes that: the location information of the first terminal is transmitted.

In an embodiment, the positioning assistance parameter includes at least one of the following: observed time difference of arrival, time of arrival, reference signal time difference, reference signal received power, receive-transmit time difference, relative time of arrival, an angle of arrival, an angle of departure, a zenith angle of departure, or a zenith angle of arrival.

The present application can overcome the technical problem that the location information of the first terminal outside the coverage area cannot be obtained and provides a location information determination method. The location information determination method includes that: a first terminal transmits positioning request information; and a second terminal responds to the positioning request information. The present application may also be applied to the case where the first terminal is in coverage.

The number of second terminals participating in the positioning of the first terminal may be at least two.

The positioning request information is used for requesting the second terminal to transmit the positioning assistance data or for notifying the second terminal that the first terminal has a positioning demand, where the positioning assistance data includes at least one of the following: PRS configuration information, terminal location information of the second terminal, a terminal list, a terminal movement speed of the second terminal, a terminal movement direction of the second terminal, or timing advance information.

The first terminal transmits first positioning parameter information, where the first positioning parameter information includes at least one of the following: a positioning measurement capability of the first terminal, a terminal movement speed of the first terminal, or a terminal movement direction of the first terminal.

In an embodiment, the positioning request information includes the first positioning parameter information.

That the second terminal responds to the positioning request information means that after receiving the positioning request information of the first terminal, the second terminal transmits the positioning assistance data.

In an embodiment, the PRS configuration information includes at least one of the following: a PRS pattern, a PRS transmission slot, PRS transmission periodicity and offset, PRS muting, or a PRS sequence.

In an embodiment, the second terminal transmits the positioning assistance data through sidelink control information.

In an embodiment, the second terminal indicates signaling content of the SCI through a positioning assistance data enable identifier, where a value of the positioning assistance data enable identifier being 0 may indicate that the SCI is used for transmitting sidelink scheduling information, and the value of the positioning assistance data enable identifier being 1 may indicate that the SCI is used for transmitting the positioning assistance data. Alternatively, the value of the positioning assistance data enable identifier being 1 may indicate that the SCI is used for transmitting the sidelink scheduling information, and the value of the positioning assistance data enable identifier being 0 may indicate that the SCI is used for transmitting the positioning assistance data. The positioning assistance data enable identifier may be included in the sidelink control information.

In an embodiment, the leader terminal is configured to determine the resource for transmitting the positioning assistance data, where the resource for transmitting the positioning assistance data includes at least one of the following: a time domain resource, a frequency domain resource, a code domain resource, or a space domain resource; and the space domain resource includes, but is not limited to, one of the following: a transmitting beam, a receiving beam, a transmitting port group, a receiving port group, a transmitting panel, or a receiving panel. The leader terminal may be the second terminal or any one of terminals identified in the terminal list. The leader terminal is configured by the base station, or configured by the first terminal, or determined through the mutual negotiation between the second terminals. The leader terminal may also be a terminal other than the second terminals and has greater authority that can control all terminals in the terminal list.

The positioning assistance data is transmitted through sidelink synchronization signal block, which includes, but is not limited to, that a domain related to the positioning assistance data is added to sidelink synchronization signal block information, such as a domain related to the PRS configuration or a domain of a movement speed and a movement direction.

The first terminal receives the positioning assistance data and calculates the location information of the first terminal according to the positioning assistance data.

In an embodiment, the first terminal broadcasts the location information.

The first terminal receives the positioning assistance data and calculates the positioning assistance parameter according to the positioning assistance data.

In an embodiment, the first terminal broadcasts the positioning assistance parameter.

In an embodiment, the second terminal receives the positioning assistance parameter and calculates the location information of the first terminal according to the positioning assistance parameter.

In an embodiment, to calculate the location information of the first terminal, the second terminal needs to receive the location information of at least one terminal other than the second terminal itself in the terminal list.

In an embodiment, the second terminal transmits the location information of the first terminal to the first terminal.

The location information determination method provided in the present application can solve the technical problem that location information of a terminal in a non-covered area cannot be positioned.

Some schemes or procedures for user positioning outside the coverage as well as signaling interaction are described below through some specific embodiments. The method described in the present application may also be applied to user positioning in the coverage area, for example, the network side does not have a positioning function. In the following embodiment, it is assumed that at least four terminals are included, where the first terminal not in the coverage area is UE0, and a terminal (the terminal is in the coverage area) participating in the positioning of the first terminal include at least UE1, UE2, and UE3. There may be the case where multiple first terminals need to be positioned. In this example, the case where one first terminal needs to be positioned is used as an example for description without losing generality, and it is assumed that all terminals in the terminal list are positioned according to a positioning server, that is, UE1, UE2 and UE3 have already known their own location information, and UE0 is the terminal that needs to be positioned. Both UE2 and UE3 need to feed back the positioning assistance data to the first terminal. In this example, the case where the second terminal is UE1 is used as an example for description.

In an embodiment, after the first terminal UE0 transmits the positioning request information, UE1 responds to the positioning request information after receiving the positioning request information. Responding to the positioning request information includes, but is not limited to, transmitting or broadcasting the positioning assistance data to UE0, where the positioning assistance data includes at least one of the following: PRS configuration information of the second terminal, terminal location information of the second terminal, a terminal list, a terminal movement speed of the second terminal, a terminal movement direction of the second terminal, or timing advance information of the second terminal. UE1 transmits the positioning assistance data through SCI. However, since the SCI supported by a protocol is used for scheduling a physical sidelink shared channel (PSSCH), it is necessary to add a new SCI format such as format3, where format3 includes the positioning assistance data; or it is necessary to add a new domain in format0 or format1 for transmitting or broadcasting the positioning assistance data. For example, if the positioning assistance data is the PRS configuration, then at least one of the following domains is included in the SCI: PRS periodicity and offset $I_{PRS}$ as shown in Table 1, but not limited to values in Table 1; the number $N_{PRS}$ of consecutive PRS slots, which refers to the number of slots for transmitting PRS consecutively, where $N_{PRS}$ is a positive integer and satisfies $1<=N_{PRS}<$ a PRS period; PRS muting bitmap, for example, including N bits, then each bit corresponds to whether to transmits a PRS in a PRS slot in one period, where a value of 0 means that the PRS is to be transmitted, and a value of 1 means that no PRS is to be transmitted; a bandwidth corresponding to a PRS; a pilot sequence index corresponding to a PRS; a resource set index corresponding to a PRS and/or a PRS resource; or a PRS pattern.

If the positioning assistance data further includes other information besides the PRS configuration, at least one of the following domains is further included: terminal location information, a terminal list, a terminal movement speed, or a terminal movement direction.

In an embodiment, the first terminal UE0 transmits the positioning request information, and UE1 responds to the positioning request information after receiving the positioning request information. Responding to the positioning request information includes, but is not limited to, transmitting or broadcasting the positioning assistance data to UE0. The second terminal broadcasts or transmits the positioning assistance data through SCI. However, since the SCI supported by a protocol is used for scheduling a PSSCH, it is necessary to add a domain to format0 or format1 of the SCI, where the domain is a positioning assistance data enable identifier domain, that is, a positioning enable identifier, which is 1 bit; in the case where a value of the positioning assistance data enable identifier is 0, it indicates that the SCI is used for transmitting sidelink scheduling information, and in the case where the value of the positioning assistance data enable identifier is 1, it indicates that the SCI is used for transmitting the positioning assistance data.

The SCI includes at least one of the following domains: the positioning assistance data enable identifier, which is 1 bit. In the case where the value is 1, the SCI domain includes at least one of the following information: PRS periodicity and offset $I_{PRS}$ as shown in Table 1, but not limited to values in Table 1; the number $N_{PRS}$ of consecutive PRS slots, which refers to the number of slots for transmitting PRS consecutively, where $N_{PRS}$ is a positive integer and satisfies $1<=N_{PRS}<$ a PRS period; PRS muting bitmap, for example, including N bits, then each bit corresponds to whether to transmit a PRS in a PRS slot in one period, where a value of 0 means that the PRS is to be transmitted, and a value of 1 means that no PRS is to be transmitted; a bandwidth corresponding to a PRS; a pilot sequence index corresponding to a PRS; a resource set index corresponding to a PRS and/or a PRS resource; or a PRS pattern.

If the positioning assistance data further includes other information besides the PRS configuration, at least one of the following domains is further included: terminal location information, a terminal list, a terminal movement speed, or a terminal movement direction.

In the case where the value of the positioning assistance data enable identifier is 0, the SCI in format0 includes at least one of the following domains: a frequency hopping flag, resource block assignment and hopping resource allocation, a time domain allocation pattern, a modulation and coding scheme, or timing advance indication. The SCI in format 1 includes at least the following domains: a priority, resource reservation, a frequency resource location of initial transmission and retransmission, a time gap between initial transmission and retransmission, a modulation and coding scheme, a retransmission index, or reserved bit information.

In addition, in the present application, the value of the positioning assistance data enable identifier being 1 may indicate that the SCI is used for transmitting the sidelink scheduling information, and the value of the positioning assistance data enable identifier being 0 may indicate that the SCI is used for transmitting the positioning assistance data.

In an embodiment, a leader UE negotiates resource configurations for transmitting the positioning assistance data by the terminal included in the terminal list, where the resource for transmitting the positioning assistance data includes at least one of the following, a time domain resource, a frequency domain resource, a code domain resource, or a space domain resource.

In this embodiment, after the first terminal UE0 transmits the positioning request information, the second terminal responds to the positioning request information after receiving the positioning request information. Responding to the positioning request information includes, but is not limited to, transmitting or broadcasting the positioning assistance data to UE0. The leader terminal determines time-frequency resources on which the terminal in the terminal list transmits the positioning assistance data, such as PRS configuration information, and the leader terminal determines locations of the time-frequency resources used by the terminal in the terminal list for transmitting the positioning assistance data. The leader terminal is agreed by the first terminal, or obtained through the negotiation between the terminals in the terminal list, or designated by the positioning server. The leader terminal broadcasts resource configuration information through broadcast signaling such as SCI or SSB or other broadcast signaling. After receiving configuration information of the positioning assistance data, each of other non-leader terminals in the terminal list determines a respective resource for the non-leader terminal to transmit the positioning assistance data according to the resource configuration information such as a slot, a period, and an offset of a time domain resource, a resource element (RE) of a frequency domain, a code domain resource, and a receiving beam and a transmitting beam of a space domain resource.

In an embodiment, after the first terminal UE0 transmits the positioning request information, the second terminal responds to the positioning request information after receiving the positioning request information. Responding to the positioning request information includes, but is not limited to, transmitting or broadcasting the positioning assistance data to UE0. The second terminal transmits the positioning assistance data through sidelink SSB Block. Some information domains need to be added to the SSB Block, such as a PRS resource index configured to indicate the PRS configuration or a PRS resource set index. A PRS resource set includes at least one PRS resource index. The PRS resource includes a parameter that can identify the PRS configuration, such as at least one of the following PRS configurations: PRS periodicity and offset, PRS muting, a PRS pattern, a PRS pilot sequence, consecutive PRS slots, or a PRS bandwidth. Of course, it is also feasible to add PRS configuration information to the sidelink SSB, or if the positioning assistance data further includes other information besides the PRS configuration, then at least one of the following domains is included: terminal location information, a terminal list, a terminal movement speed, or a terminal movement direction.

In an embodiment, this embodiment is used for describing a process of positioning of an entire system in the case where UE0 has a location information estimation capability. The steps described below are included.

A1) UE0 transmits positioning request information.

The positioning request information is used for requesting a second terminal to transmit positioning assistance data or notifying the second terminal that UE0 has a positioning demand.

In an embodiment, the positioning request information includes a positioning measurement capability of a first terminal, where the positioning measurement capability of the first terminal indicates at least one of the following that: the first terminal has a location information estimation capability or the first terminal has only a positioning assistance parameter estimation capability. In this example, the first terminal has the location information estimation capability.

In an embodiment, the positioning request information includes the positioning parameter information; or the positioning parameter information is transmitted independently of the positioning request information. The transmitting time is not limited, that is, the positioning parameter information is transmitted through positioning parameter signaling besides the positioning request information. The signaling may be transmitted at the same time as the positioning request information or may be transmitted after or before the positioning request information is transmitted.

A2) UE1, UE2, and UE3 transmit the positioning assistance data, respectively.

The positioning assistance data includes, but is not limited to, at least one of the following: PRS configurations of UE1, UE2, and UE3; location information of UE1, UE2, and UE3; a terminal list; or timing advance information of UE1, UE2, and UE3. UE1, UE2, and UE3 are identified by the terminal list.

Resources used for transmitting the positioning assistance data may be configured by a leader terminal.

A3) UE0 estimates location information of UE0 according to the positioning assistance data transmitted by UE1, UE2, and UE3.

According to the positioning assistance data transmitted by UE1, UE2, and UE3, such as measurement PRS configuration information, UE0 obtains time of arrival TODi from UEi to UE0, where i=1, 2, or 3, or calculates RSTD1 between time of arrival TOD1 from UE1 to UE0 and time of arrival TOD2 from UE2 to UE0 and RSTD2 between the time of arrival TODi from UE1 to UE0 and time of arrival TOD3 from UE3 to UE0.

If the location information of UE1 to UE3 is not included in the positioning assistance data, the location information of UE1 to UE3 is received; otherwise, the location information of UE1 to UE3 is extracted from the positioning assistance data of UE1 to UE3.

According to TOD1, TOD2 and the location information of UE1 to UE3, the location information of UE0 is calculated through the existing positioning algorithm.

If the positioning assistance data includes the timing advance information, TOD1 and TOD2 need to be adjusted according to the timing advance information. For example, when TODi is calculated, where i=1, 2, or 3, the timing advance information of a corresponding terminal is subtracted to ensure that TODi only includes a signal transmission time difference caused by different geographic locations.

A4) UE0 broadcasts the location information to UE1, UE2, and UE3.

In an embodiment, this embodiment is used for describing a process of positioning of an entire system in the case where UE0 has only a capability of estimating the positioning assistance parameter. The steps described below are included.

A1) UE0 transmits positioning request information.

The positioning request information is used for requesting a second terminal to transmit positioning assistance data or notifying the second terminal that UE0 has a positioning demand.

In an embodiment, the positioning request information includes a positioning measurement capability of a first terminal, where the positioning measurement capability of the first terminal indicates at least one of the following that: the first terminal has a location information estimation capability or the first terminal has only a positioning assistance parameter estimation capability. In this example, the first terminal has only the positioning assistance parameter estimation capability.

In an embodiment, the positioning request information includes the positioning parameter information; or the positioning parameter information is transmitted independently of the positioning request information. The transmitting time is not limited, that is, the positioning parameter information is transmitted through positioning parameter signaling besides the positioning request information. The signaling may be transmitted at the same time as the positioning request information or may be transmitted after or before the positioning request information is transmitted.

A2) UE1, UE2, and UE3 transmit the positioning assistance data, respectively.

The positioning assistance data includes, but is not limited to, at least one of the following: PRS configurations of UE1, UE2, and UE3; location information of UE1, UE2, and UE3; a terminal list; or timing advance information of UE1, UE2, and UE3.

A3) UE0 receives the positioning assistance data transmitted by UE1, UE2, and UE3 and estimates RSTD information according to the received positioning assistance data.

According to the positioning assistance data transmitted by UE1, UE2, and UE3, such as measurement PRS configuration information, UE0 obtains time of arrival TODi from UEi to UE0, where i=1, 2, or 3, or calculates RSTD1 between time of arrival TOD1 from UE1 to UE0 and time of arrival TOD2 from UE2 to UE0 and RSTD2 between the time of arrival TOD1 from UE1 to UE0 and time of arrival TOD3 from UE3 to UE0.

A4) UE0 broadcasts the RSTD information to UE1, UE2, and UE3.

A5) At least one UE of UE1, UE2, and UE3 estimates location information of UE0 and transmits the location information of UE0 to UE0.

A UE that is among UE1, UE2, and UE3 and configured to calculate location information may receive location information of other terminals. Without losing generality, it is assumed that UE1 is configured to calculate location information, then UE1 needs to receive location information of UE2 and UE3, and calculate the location information of UE0 in conjunction with location information of UE1 and the received RSTD1 and RSTD2.

After the location information of UE0 is calculated, the location information of UE0 is broadcast so that UE0, or UE2 and UE3 can know the location information of UE0.

In an embodiment, this embodiment is used for describing a process of positioning of an entire system in the case where UE0 has only a capability of estimating the positioning assistance parameter and a leader terminal exists. The steps described below are included.

A1) UE0 transmits positioning request information.

The positioning request information is used for requesting a second terminal to transmit positioning assistance data or notifying the second terminal that UE0 has a positioning demand.

In an embodiment, the positioning request information includes a positioning measurement capability of a first terminal, where the positioning measurement capability of the first terminal represents at least one of the following that: the first terminal has a location information estimation capability or the first terminal has only a positioning assistance parameter estimation capability. In this example, the first terminal has only the positioning assistance parameter estimation capability.

In an embodiment, the positioning request information includes the positioning parameter information; or the positioning parameter information is transmitted independently of the positioning request information. The transmitting time is not limited, that is, the positioning parameter information is transmitted through positioning parameter signaling besides the positioning request information. The signaling may be transmitted at the same time as the positioning request information or may be transmitted after or before the positioning request information is transmitted.

A2) A leader UE transmits configuration information of resources used for transmitting the positioning assistance data to UE1, UE2, and UE3.

The leader UE is one of UE1, UE2, or UE3. Which UE is the leader UE may be negotiated and determined by UE1, UE2, and UE3 or configured by the network side, or the leader UE is the UE that is among UE1, UE2, and UE3 and has a location information calculation capability. The leader UE may also be a UE independent of UE1, UE2, and UE3 and can control UE1, UE2, and UE3.

The configuration information of resources used for transmitting the positioning assistance data includes, but is not limited to, time domain resources, frequency domain resources, space domain resources, and code domain resources.

A3) UE1, UE2, and UE3 transmit the positioning assistance data respectively according to the resource configuration information configured by the leader UE.

The positioning assistance data includes, but is not limited to, at least one of the following: PRS configurations of UE1, UE2, and UE3; location information of UE1, UE2, and UE3; a terminal list; or timing advance information of UE1, UE2, and UE3.

A4) UE0 estimates RSTD information according to the positioning assistance data transmitted by UE1, UE2, and UE3.

According to the positioning assistance data transmitted by UE1, UE2, and UE3, such as measurement PRS configuration information, UE0 obtains time of arrival TODi from UEi to UE0, where i=1, 2, or 3, or calculates RSTD1 between time of arrival TOD1 from UE1 to UE0 and time of arrival TOD2 from UE2 to UE0 and RSTD2 between the time of arrival TODi from UE1 to UE0 and time of arrival TOD3 from UE3 to UE0.

A5) UE0 broadcasts the RSTD information to UE1, UE2, and UE3.

A6) At least one UE of UE1, UE2, and UE3 estimates location information of UE0 and transmits the location information of UE0 to UE0.

A UE that is among UE1, UE2, and UE3 and configured to calculate location information may receive location information of other terminals. Without losing generality, it is assumed that UE1 is configured to calculate location information, then UE1 needs to receive location information of UE2 and UE3, and calculate the location information of UE0 in conjunction with location information of UE1 and the received RSTD1 and RSTD2.

After the location information of UE0 is received, the location information of UE0 is broadcast so that UE0, or UE2 and UE3 can know the location information of UE0.

If UE0 has a capability of calculating location information, then A5) and A6) are not needed. UE0 calculates the location information of UE0 according to the RSTD information, and before calculating the location information of UE0, UE0 needs to obtain location information of UE1 to UE3.

In an embodiment, this embodiment is used for describing a process of positioning an entire system in the case where UE0 has only a capability of estimating the positioning assistance parameter and a leader terminal does not exist. The steps described below are included.

A1) UE0 transmits positioning request information.

The positioning request information is used for requesting a second terminal to transmit positioning assistance data or notifying the second terminal that UE0 has a positioning demand.

In an embodiment, the positioning request information includes a positioning measurement capability of a first terminal, where the positioning measurement capability of the first terminal indicates at least one of the following that: the first terminal has a location information estimation capability or the first terminal has only a positioning assistance parameter estimation capability. In this example, the first terminal has only the positioning assistance parameter estimation capability.

In an embodiment, the positioning request information includes the positioning parameter information; or the positioning parameter information is transmitted independently of the positioning request information. The transmitting time is not limited, that is, the positioning parameter information is transmitted through positioning parameter signaling outside of the positioning request information. The signaling may be transmitted at the same time as the positioning request information or may be transmitted after or before the positioning request information is transmitted.

A2) UE1, UE2, and UE3 transmit the positioning assistance data, respectively.

The positioning assistance data includes, but is not limited to, at least one of the following: PRS configurations of UE1, UE2, and UE3; location information of UE1, UE2, and UE3; terminal lists of UE1, UE2, and UE3; or timing advance information of UE1, UE2, and UE3.

Resources used by UE1, UE2, and UE3 for transmitting the positioning assistance data may be obtained through the negotiation between UE1, UE2, and UE3, or configured by the network side, or determined by UE1, UE2, and UE3, for example, determined according to a UE index.

A3) UE0 receives the positioning assistance data transmitted by UE1, UE2, and UE3 to estimate OTDOA information.

According to the positioning assistance data transmitted by UE1, UE2, and UE3, such as measurement PRS configuration information, UE0 obtains time of arrival TODi from UEi to UE0, where i=1, 2, or 3, or calculates RSTD1 between time of arrival TOD1 from UE1 to UE0 and time of arrival TOD2 from UE2 to UE0 and RSTD2 between the time of arrival TOD1 from UE1 to UE0 and time of arrival TOD3 from UE3 to UE0. UE0 determines RSTD information based on TOD information.

A4) UE0 broadcasts the RSTD information to UE1, UE2, and UE3.

A5) At least one UE of UE1, UE2, and UE3 estimates location information of UE0 and transmits the location information of UE0 to UE0.

For example, UE1 may obtain the location information of UE0 according to the received location information of UE2 and UE3 and the received RSTD1 and RSTD2 and broadcast the location information of UE0 to UE0, UE2, and UE3.

For example, UE2 may obtain the location information of UE0 according to the received location information of UE1 and UE3 and the received RSTD1 and RSTD2 and broadcast the location information of UE0 to UE0, UE1, and UE3.

For example, UE3 may obtain the location information of UE0 according to the received location information of UE2 and UE1 and the received RSTD1 and RSTD2 and broadcast the location information of UE0 to UE0, UE2, and UE1.

UE1, UE2 and UE3 respectively and independently calculate the location information of UE0, broadcast the location information of UE0 to other UEs, and receive the location information of UE0 broadcast by other UEs. Final location information is estimated according to multiple pieces of location information of UE0, for example, the final location information is obtained by averaging the multiple pieces of location information of UE0.

In an embodiment, this embodiment is used for describing that UE0 transmits the positioning assistance data, and UE1 to UE3 respectively estimate the positioning assistance parameter according to the positioning assistance data to calculate the location information of UE0. The positioning assistance data includes at least positioning reference signal configuration information of the first terminal. The method in this example includes the steps described below.

A1) UE0 transmits positioning request information.

The positioning request information is used for notifying a second terminal that UE0 has a positioning demand.

2) The second terminal responds to the positioning request information.

At least one UE in the second terminals responds to the positioning request information of UE0. For example, UE1 responds to the positioning request information of UE0. Which UE responds may be configured by the network side, or determined through the negotiation between UE1 to UE3, or determined by a leader UE among UE1 to UE3, or a leader UE, which is referred to herein as a responding UE.

Responding to the positioning request information of UE0 includes, but is not limited to, at least one of the following, instructing UE0 to transmit the positioning assistance data, instructing UE0 to transmit a resource of the positioning assistance data, instructing UE0 to transmit the positioning assistance data through SCI, instructing UE0 to transmit the positioning assistance data through sidelink SSB, or instructing at least one UE other than the responding UE in the terminal list to transmit the location information.

A3) UE0 transmits the positioning assistance data.

A4) At least one UE of UE1 to UE3 transmits location information of the at least one UE itself.

A terminal configured to estimate location information of UE0 may not need to transmit location information of the terminal since the terminal knows the location information of the terminal itself.

A5) At least one UE of UE1 to UE3 receives the positioning assistance data, calculates a positioning assistance parameter according to the received positioning assistance data, and broadcasts the positioning assistance parameter.

At least one UE of UE1 to UE3 receives the positioning assistance data and calculates time of arrival from UE0 to the at least one UE according to the received positioning assistance data. For example, UE1, UE2, and UE3 respectively receive PRS of UE0 and calculate TOD1 from UE0 to UE1, TOD2 from UE0 to UE2, and TOD3 from UE0 to UE3, respectively.

A6) A positioning UE receives TOD1 to TOD3 and location information of UE1 to UE3 and calculates the location information of UE0 according to TOD1 to TOD3 and the location information of UE1 to UE3.

The positioning UE broadcasts the location information of UE0.

The positioning UE may be any UE that is among UE0 to UE3 and has a location information calculation capability.

In an embodiment, this embodiment is used for describing that UE0 transmits the positioning assistance data, and UE1 to UE3 estimate the positioning assistance parameter according to the positioning assistance data. The method includes the following described below.

A first terminal transmits positioning request information; and the first terminal receives a positioning request response from a second terminal. Positioning assistance data is transmitted according to the positioning request response.

In an embodiment, this embodiment is used for describing that UE0 transmits the positioning assistance data, and UE1 to UE3 estimate the positioning assistance parameter according to the positioning assistance data. The method includes the following described below.

A second terminal responds to positioning request information from a first terminal; transmits a positioning request response, receives positioning assistance data from the first terminal and calculates a positioning assistance parameter according to the positioning assistance data, and broadcasts the positioning assistance parameter and location information of the second terminal.

A positioning terminal receives the positioning assistance parameter and the location information of the second terminal and calculates location information of the first terminal according to the positioning assistance parameter and the location information of the second terminal.

The positioning terminal is the first terminal or a second terminal having a location information calculation capability.

A terminal configured to calculate the location information of the first terminal broadcasts the location information of the first terminal.

Figure 3:
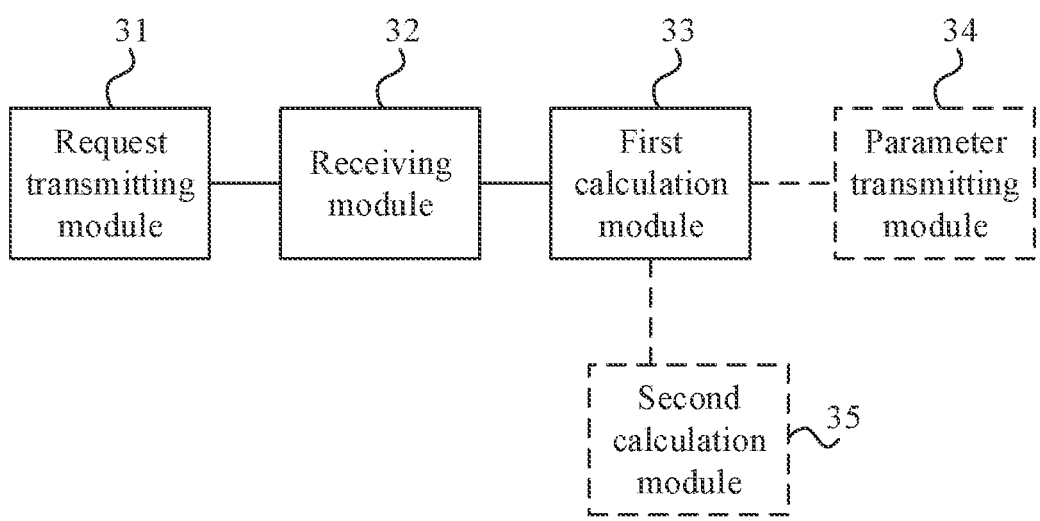
FIG. 3 is a structural diagram of a location information determination device according to an embodiment of the present application.

The present application provides a location information determination device. FIG. 3 is a structural diagram of a location information determination device according to an embodiment of the present application. As shown in FIG. 3, the location information determination device provided in an embodiment of the present application may be integrated on a first terminal. The device includes a request transmitting module 31, a receiving module 32, a first calculation module 33, and a parameter transmitting module 34 or a second calculation module 35. The request transmitting module 31 is configured to transmit positioning request information. The receiving module 32 is configured to receive positioning assistance data transmitted by a second terminal. The first calculation module 33 is configured to calculate a positioning assistance parameter according to the positioning assistance data. The parameter transmitting module 34 is configured to transmit the positioning assistance parameter. The second calculation module 35 is configured to calculate location information of the first terminal according to the positioning assistance parameter.

The location information determination device in the present application may include the parameter transmitting module 34 or the second calculation module 35. Therefore, the parameter transmitting module 34 and the second calculation module 35 are shown in dashed lines in FIG. 3, so as to indicate that the two modules alternatively exist.

The location information determination device provided in this embodiment is configured to implement the location information determination method in the embodiment shown in FIG. 1. The implementation principle and technical effect of the location information determination device provided in this embodiment are similar to the implementation principle and technical effect of the location information determination method in the embodiment shown in FIG. 1, which is not repeated herein.

In an embodiment, at least two second terminals are provided.

In an embodiment, the positioning assistance data in the receiving module 32 includes at least one of the following information of the second terminal: positioning reference signal configuration information, terminal location information, a terminal list, a terminal movement speed, a terminal movement direction, or timing advance information.

In an embodiment, in the case where the positioning assistance data in the receiving module 32 includes the positioning reference signal configuration information, the positioning reference signal configuration information includes at least one of the following: a positioning reference signal pattern, a positioning reference signal transmitting slot, positioning reference signal transmitting periodicity and offset, positioning reference signal muting, or a positioning reference signal sequence.

In an embodiment, the device further includes a positioning parameter information transmitting module, which is configured to transmit positioning parameter information, where the positioning parameter information includes at least one of the following of the first terminal: a positioning measurement capability, a movement speed, or a movement direction.

In an embodiment, the positioning request information in the request transmitting module 31 includes the positioning parameter information.

In an embodiment, the positioning assistance data in the receiving module 32 is transmitted through sidelink control information.

In an embodiment, the sidelink control information in the receiving module 32 includes a positioning enable identifier, where the positioning enable identifier is configured to indicate signaling content of the sidelink control information.

In an embodiment, indicating, by the positioning enable identifier in the receiving module 32, the signaling content of the sidelink control information includes: in the case where a value of the positioning enable identifier is first data, indicating that the sidelink control information is used for transmitting sidelink scheduling information; and in the case where the value of the positioning enable identifier is second data, indicating that the sidelink control information is used for transmitting the positioning assistance data.

In an embodiment, the positioning assistance data in the receiving module 32 is transmitted through sidelink synchronization information block.

In an embodiment, a resource for transmitting the positioning assistance data by the second terminal is configured by a leader terminal, where the resource for transmitting the positioning assistance data includes at least one of the following: a time domain resource, a frequency domain resource, a code domain resource, or a space domain resource.

In an embodiment, the second calculation module 35 is configured to calculate the location information of the first terminal according to terminal location information of the second terminal and the positioning assistance parameter.

In an embodiment, the positioning assistance parameter in the first calculation module 33 includes at least one of the following: observed time difference of arrival, time of arrival, reference signal time difference, reference signal received power, receive-transmit time difference, relative time of arrival, an angle of arrival, an angle of departure, a zenith angle of departure, or a zenith angle of arrival.

In an embodiment, the device further includes a broadcast module, which is configured to broadcast the location information of the first terminal.

In an embodiment, the device further includes a location information receiving module, which is configured to receive the location information of the first terminal in the case where the positioning assistance parameter is transmitted.

Figure 4:
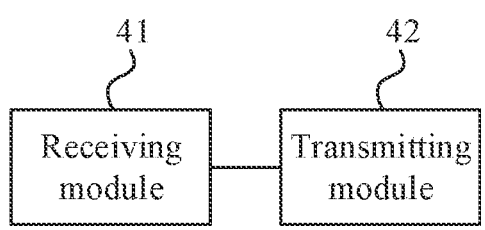
FIG. 4 is a structural diagram of another location information determination device according to an embodiment of the present application.

The present application further provides a location information determination device. FIG. 4 is a structural diagram of another location information determination device according to an embodiment of the present application. As shown in FIG. 4, a location information determination device provided in an embodiment of the present application may be integrated on a second terminal. The device includes a receiving module 41 and a transmitting module 42. The receiving module 41 is configured to receive positioning request information transmitted by a first terminal. The transmitting module 42 is configured to transmit positioning assistance data.

The location information determination device provided in this embodiment is configured to implement the location information determination method in the embodiment shown in FIG. 2. The implementation principle and technical effect of the location information determination device provided in this embodiment are similar to the implementation principle and technical effect of the location information determination method in the embodiment shown in FIG. 2, which is not repeated herein.

In an embodiment, the positioning assistance data in the receiving module 41 includes at least one of the following information of the second terminal: positioning reference signal configuration information, terminal location information, a terminal list, a terminal movement speed, a terminal movement direction, or timing advance information.

In an embodiment, in the case where the positioning assistance data in the receiving module 41 includes the positioning reference signal configuration information, the positioning reference signal configuration information includes at least one of the following: a positioning reference signal pattern, a positioning reference signal transmitting slot, positioning reference signal transmitting periodicity and offset, positioning reference signal muting, or a positioning reference signal sequence.

In an embodiment, the device further includes a positioning parameter information receiving module, which is configured to receive positioning parameter information, where the positioning parameter information includes at least one of the following of the first terminal: a positioning measurement capability, a movement speed, or a movement direction.

In an embodiment, the positioning request information in the receiving module 41 includes the positioning parameter information.

In an embodiment, the transmission module 42 is configured to transmit the positioning assistance data through sidelink synchronization information block.

In an embodiment, the transmitting module 42 is configured to transmit the positioning assistance data through sidelink control information.

In an embodiment, the sidelink control information in the transmission module 42 includes a positioning enable identifier, where the positioning enable identifier is configured to indicate signaling content of the sidelink control information.

In an embodiment, the device further includes a setting module, which is configured to, in the case where the sidelink control information is for transmitting sidelink scheduling information, set a value of the positioning enable identifier to be first data; and in the case where the SCI is for transmitting the positioning assistance data, set the value of the positioning enable identifier to be second data.

In an embodiment, the device further includes a configuration module, which is configured such that a leader terminal configures a resource for transmitting the positioning assistance data by the second terminal, where the resource for transmitting the positioning assistance data includes at least one of the following: a time domain resource, a frequency domain resource, a code domain resource, or a space domain resource.

In an embodiment, the device further includes a calculation module, which is configured to receive the positioning assistance parameter, and calculate the location information of the first terminal according to the positioning assistance parameter and location information of at least two terminals included in the terminal list.

In an embodiment, the device further includes a location information transmitting module, which is configured to transmit the location information of the first terminal.

In an embodiment, the positioning assistance parameter in the calculation module includes at least one of the following: observed time difference of arrival, time of arrival, reference signal time difference, reference signal received power, receive-transmit time difference, relative time of arrival, an angle of arrival, an angle of departure, a zenith angle of departure, or a zenith angle of arrival.

Figure 5:
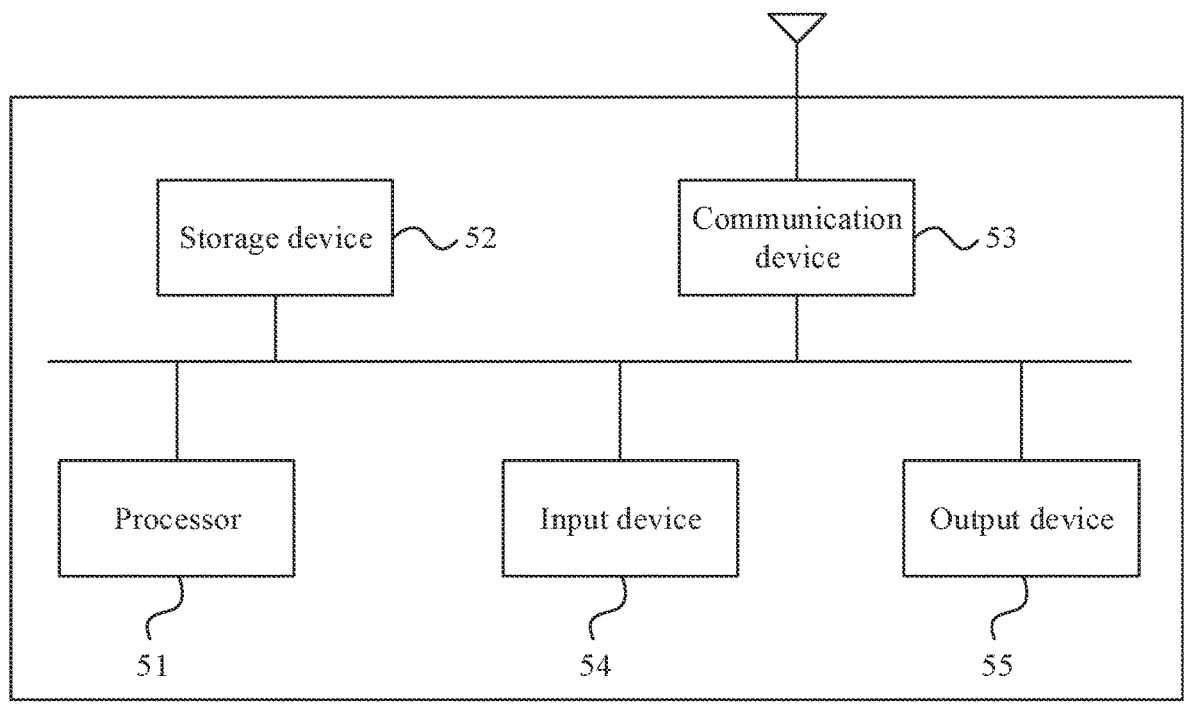
FIG. 5 is a structural diagram of a first terminal according to an embodiment of the present application.

An embodiment of the present application further provides a first terminal. FIG. 5 is a structural diagram of a first terminal according to an embodiment of the present application. As shown in FIG. 5, the first terminal provided in the present application includes one or more processors 51 and a storage device 52. One or more processors 51 may be provided in the first terminal. In FIG. 5, one processor 51 is used as an example. The storage device 52 is configured to store one or more programs. The one or more programs, when executed by the one or more processors 51, cause the one or more processors 51 to implement the location information determination method described in embodiments of the present disclosure.

The first terminal further includes a communication device 53, an input device 54, and an output device 55.

The processor 51, the storage device 52, the communication device 53, the input device 54, and the output device 55 in the first terminal may be connected via a bus or other means, with connection via a bus as an example in FIG. 5.

The input device 54 may be used for receiving inputted digital or character information and for generating key signal input related to user settings and function control of the first terminal. The output device 55 may include display apparatuses such as a display screen.

The communication device 53 may include a receiver and a transmitter. The communication device 53 is configured to perform information transceiving and communication under the control of the processor 51.

As a computer-readable storage medium, the storage device 52 may be configured to store software programs, computer-executable programs, and modules such as program instructions/modules (for example, the request transmitting module 31, the receiving module 32, the first calculation module 33, the parameter transmitting module 34, and the second calculation module 35 in the location information determination device) corresponding to the location information determination method described in the embodiments of the present application. The storage device 52 may include a program storage area and a data storage area. The program storage area may store an operating system and an application program required by at least one function. The data storage area may store data created depending on use of a device. Additionally, the storage device 52 may include a high-speed random-access memory, and may further include a nonvolatile memory, such as at least one dick memory, a flash memory, or another nonvolatile solid-state memory. In some examples, the storage device 52 may include memories which are remotely disposed with respect to the processor 51. These remote memories may be connected to the first terminal via a network. The examples of the preceding network include, but are not limited to, the Internet, an intranet, a local area network, a mobile communication network, and a combination thereof.

Figure 6:
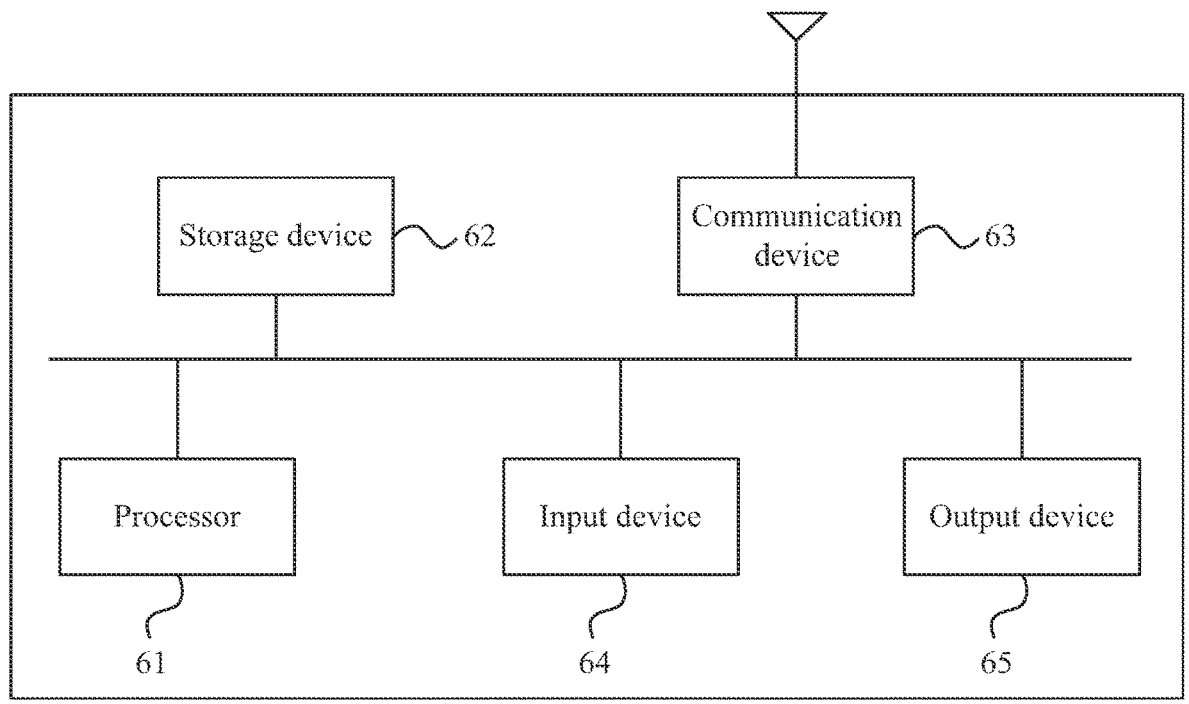
FIG. 6 is a structural diagram of a second terminal according to an embodiment of the present application.

An embodiment of the present application further provides a second terminal. FIG. 6 is a structural diagram of a second terminal according to an embodiment of the present application. As shown in FIG. 6, the second terminal provided in the present application includes one or more processors 61 and a storage device 62. One or more processors 61 may be provided in the second terminal. In FIG. 6, one processor 61 is used as an example. The storage device 62 is configured to store one or more programs. The one or more programs, when executed by the one or more processors 61, cause the one or more processors 61 to implement the location information determination method described in the embodiments of the present disclosure.

The second terminal further includes a communication device 63, an input device 64, and an output device 65.

The processor 61, the storage device 62, the communication device 63, the input device 64, and the output device 65 in the second terminal may be connected via a bus or other means, with connection via a bus as an example in FIG. 6.

The input device 64 may be used for receiving inputted digital or character information and for generating key signal input related to user settings and function control of the second terminal. The output device 65 may include display apparatuses such as a display screen.

The communication device 63 may include a receiver and a transmitter. The communication device 63 is configured to perform information transceiving and communication under the control of the processor 61.

As a computer-readable storage medium, the storage device 62 may be configured to store software programs, computer-executable programs, and modules such as program instructions/modules (for example, the receiving module 41 and the transmitting module 42 in the location information determination device) corresponding to the location information determination method described in the embodiments of the present application. The storage device 62 may include a program storage area and a data storage area. The program storage area may store an operating system and an application program required by at least one function. The data storage area may store data created depending on use of a device. Additionally, the storage device 62 may include a high-speed random-access memory, and may further include a nonvolatile memory, such as at least one dick memory, a flash memory, or another nonvolatile solid-state memory. In some examples, the storage device 62 may include memories which are remotely disposed with respect to the processor 61. These remote memories may be connected to the second terminal via a network. The examples of the preceding network include, but are not limited to, the Internet, an intranet, a local area network, a mobile communication network, and a combination thereof.

An embodiment of the present application further provides a storage medium. The storage medium is configured to store a computer program which, when executed by a processor, implements any of the location information determination methods described in the embodiments of the present application. For example, the location information determination method applied to the first terminal and the terminal location information determination method applied to the second terminal are implemented. The location information determination method applied to the first terminal includes that: positioning request information is transmitted; positioning assistance data transmitted by the second terminal is received; a positioning assistance parameter is calculated according to the positioning assistance data; and the positioning assistance parameter is transmitted or location information of the first terminal is calculated according to the positioning assistance parameter.

The terminal location information determination method applied to the second terminal includes that: positioning request information transmitted by the first terminal is received; and positioning assistance data is transmitted.

The above are only exemplary embodiments of the present application and are not intended to limit the scope of the present application.

The term terminal encompasses any appropriate type of radio user devices, such as a mobile phone, a portable data processing apparatus, a portable web browser, or a vehicle-mounted mobile station.

In general, the embodiments of the present application may be implemented in hardware or dedicated circuits, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, may represent interconnected logic circuits, modules, and functions, or may represent a combination of program steps, logic circuits, modules, and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. The computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A location information determination method, applied to a first terminal, comprising:
transmitting positioning request information;
receiving positioning assistance data transmitted by a second terminal;
calculating a positioning assistance parameter according to the positioning assistance data; and
transmitting the positioning assistance parameter, or calculating location information of the first terminal according to the positioning assistance parameter,
wherein the positioning assistance data comprises at least one of the following of the second terminal: positioning reference signal configuration information, location information, a terminal list, a movement speed, a movement direction, or timing advance information;
the positioning request information comprises positioning parameter information, and the positioning parameter information comprises at least one of the following: a positioning measurement capability of the first terminal, a movement speed of the first terminal, or a movement direction of the first terminal; and the positioning assistance parameter comprises at least one of the following:

observed time difference of arrival, time of arrival, reference signal time difference, reference signal received power, receive-transmit (RX-TX) time difference, relative time of arrival, an angle of arrival, an angle of departure, a zenith angle of departure, or a zenith angle of arrival; and wherein in a case where the positioning assistance data comprises the positioning reference signal configuration information, the positioning reference signal configuration information comprises at least one of the following: a positioning reference signal pattern, a positioning reference signal transmitting slot, positioning reference signal transmitting periodicity and offset, positioning reference signal muting, or a positioning reference signal sequence.

2. The method of claim 1, wherein at least two second terminals are provided.

3. The method of claim 1, further comprising:
transmitting positioning parameter information, wherein the positioning parameter information comprises at least one of the following of the first terminal: a positioning measurement capability, a movement speed, or a movement direction.

4. The method of claim 1, wherein the positioning assistance data is transmitted through sidelink control information;
wherein the sidelink control information comprises a positioning enable identifier, and the positioning enable identifier is configured to indicate signaling content of the sidelink control information; and
wherein indicating, by the positioning enable identifier, the signaling content of the sidelink control information comprises:
in a case where a value of the positioning enable identifier is first data, indicating that the sidelink control information is used for transmitting sidelink scheduling information; and
in a case where the value of the positioning enable identifier is second data, indicating that the sidelink control information is used for transmitting the positioning assistance data.

5. The method of claim 1, wherein the positioning assistance data is transmitted through sidelink synchronization information block.

6. The method of claim 1, wherein a resource for transmitting the positioning assistance data by the second terminal is configured by a leader terminal, and the resource for transmitting the positioning assistance data comprises at least one of the following: a time domain resource, a frequency domain resource, a code domain resource, or a space domain resource.

7. The method of claim 1, wherein calculating the location information of the first terminal according to the positioning assistance parameter comprises:
calculating the location information of the first terminal according to terminal location information of the second terminal and the positioning assistance parameter.

8. The method of claim 1, wherein after calculating the location information of the first terminal according to the positioning assistance parameter, the method further comprises:
broadcasting the location information of the first terminal.

9. The method of claim 1, wherein after transmitting the positioning assistance parameter, the method further comprises:
receiving the location information of the first terminal.

10. A location information determination method, applied to a second terminal, comprising:
receiving positioning request information transmitted by a first terminal; and
transmitting positioning assistance data,
wherein the positioning assistance data comprises at least one of the following of the second terminal: positioning reference signal configuration information, location information, a terminal list, a movement speed, a movement direction, or timing advance information; and the positioning request information comprises positioning parameter information, and the positioning parameter information comprises at least one of the following: a positioning measurement capability of the first terminal, a movement speed of the first terminal, or a movement direction of the first terminal; and
wherein in a case where the positioning assistance data comprises the positioning reference signal configuration information, the positioning reference signal configuration information comprises at least one of the following: a positioning reference signal pattern, a positioning reference signal transmitting slot, positioning reference signal transmitting periodicity and offset, positioning reference signal muting, or a positioning reference signal sequence.

11. The method of claim 10, further comprising:
receiving positioning parameter information, wherein the positioning parameter information comprises at least one of the following of the first terminal: a positioning measurement capability, a movement speed, or a movement direction.

12. The method of claim 10, wherein transmitting the positioning assistance data comprises:
transmitting the positioning assistance data through sidelink synchronization information block.

13. The method of claim 10, wherein transmitting the positioning assistance data comprises:
transmitting the positioning assistance data through sidelink control information;
wherein the sidelink control information comprises a positioning enable identifier, and the positioning enable identifier is configured to indicate signaling content of the sidelink control information; and
wherein the method further comprises:
in a case where the sidelink control information is used for transmitting sidelink scheduling information, setting a value of the positioning enable identifier to be first data; and
in a case where the sidelink control information is used for transmitting the positioning assistance data, setting the value of the positioning enable identifier to be second data.

14. The method of claim 10, wherein a resource for transmitting the positioning assistance data by the second terminal is configured by a leader terminal, and the resource for transmitting the positioning assistance data comprises at least one of the following: a time domain resource, a frequency domain resource, a code domain resource, or a space domain resource.

15. The method of claim 10, further comprising:
receiving a positioning assistance parameter;
calculating location information of the first terminal according to the positioning assistance parameter and location information of at least two terminals comprised in a terminal list; and
transmitting the location information of the first terminal;

wherein the positioning assistance parameter comprises at least one of the following:

observed time difference of arrival, time of arrival, reference signal time difference, reference signal received power, receive-transmit (RX-TX) time difference, relative time of arrival, an angle of arrival, an angle of departure, a zenith angle of departure, or a zenith angle of arrival.

16. A first terminal, comprising:
at least one processor; and
a storage device storing at least one program;
wherein the at least one program, when executed by the at least one processor, causes the at least one processor to implement the location information determination method of claim 1.

17. A second terminal, comprising:
at least one processor; and
a storage device storing at least one program;
wherein the at least one program, when executed by the at least one processor, causes the at least one processor to implement the location information determination method of claim 10.

18. A non-transitory computer-readable storage medium storing a computer program, wherein the computer program, when executed by a processor, implements the location information determination method of claim 1.

* * * * *